A.I.
Additional Improvement on Patent No 17,147.
K. Goddard.
Inkstand.
No 179. A.I. Patented Nov. 3, 1857.
BEST AVAILABLE COPY
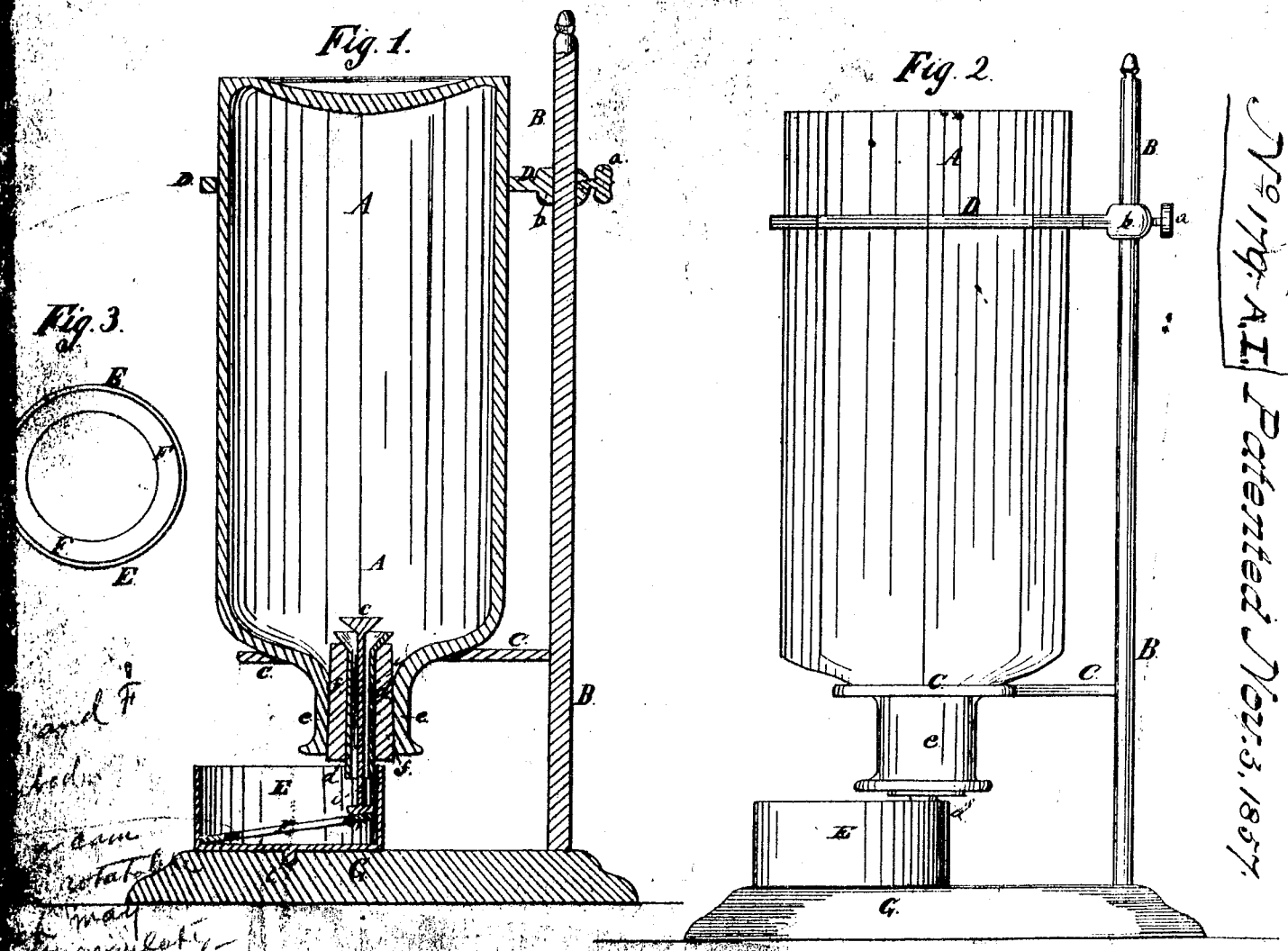

BEST AVAILABLE COPY

Fig. 1, represents a vertical section.

Fig. 2, a side elevation.

Fig. 3, a top view of the cup of my improved inkstand.

The stand or base G is made of any suitable (and sufficiently heavy) material and to it is securely fastened an upright metalic rod B, fitting upon which is a dog b, to this dog (which is capable of a sliding motion vertically upon the rod B is attached a circular metal ring or clasp D which with the dog is secured in its position upon the rod B by a thumb screw a. C is a metallic ring which is secured to the rod B in a manner as above described of the ring D, or by any convenient means, and is so adjusted and fastened upon said rod B as to support the bottle A at any desired height from the base or stand G.

A represents an ordinary ink bottle furnished with a common cork f, through the centre of which is a hole for the insertion of a tube d made of any suitable material; this tube is somewhat longe than the cork and extends a short distance through on its outer side, in order that, (when the bottle is in the position shown at Fig. 1) its lower end may dip into the cup E and extend slightly below the upper edge of the same. The simple cup E, forms the receptacle from which the ink is to be used.

The operation of my invention is as follows: The bottle A being full of ink the tube d above described is inserted through the hole made in the cork, and the bottle placed and secured in the stand, the lower end of the tube d being within the cup; the ink as soon as the bottle is in this position will flow from the bottle until it has reached a height in the cup E level with the mouth of the tube d, and there remain until the bottle is empty.

What I claim as new and useful and desire to secure by "Additional letters patent" is,

The straight tube d, in combination with a simple cup or receptacle E, substantially as and for the purposes herein described.